US008839286B2

(12) United States Patent
Auwens (10) Patent No.: US 8,839,286 B2
(45) Date of Patent: Sep. 16, 2014

(54) DISPLAY OF ENHANCED CONTENT (75) Inventor: Johannes Cornelis Leonardus Auwens, Oisterwijk (NL)

(73) Assignee: UPC Broadband Operations BV, Schiphol-Rijk (NL)

( * ) Notice: Subject to any disclaimer, the term of this patent is extended or adjusted under 35 U.S.C. 154(b) by 1002 days.

(21) Appl. No.: 11/569,337

(22) PCT Filed: May 17, 2005

(86) PCT No.: PCT/IB2005/001877
§ 371 (c)(1),
(2), (4) Date: Mar. 10, 2008

(87) PCT Pub. No.: WO2005/120065
PCT Pub. Date: Dec. 15, 2005

(65) Prior Publication Data
US 2008/0189732 A1 Aug. 7, 2008

(30) Foreign Application Priority Data
May 19, 2004 (GB) .................................. 0411172.0

(51) Int. Cl.
*H04N 7/10* (2006.01)
*H04N 7/025* (2006.01)
(52) U.S. Cl.
USPC .................................. 725/32; 725/34; 725/36
(58) Field of Classification Search
USPC ........................... 725/22, 32, 34–36; 382/100; 713/176–179; 348/589
See application file for complete search history.

(56) References Cited

U.S. PATENT DOCUMENTS

| 6,411,725 | B1 * | 6/2002 | Rhoads | 382/100 |
| 6,714,683 | B1 | 3/2004 | Tian et al. | |
| 2001/0054150 | A1 * | 12/2001 | Levy | 713/176 |
| 2002/0059644 | A1 * | 5/2002 | Andrade et al. | 725/136 |
| 2002/0076083 | A1 * | 6/2002 | Levy | 382/100 |
| 2003/0112996 | A1 * | 6/2003 | Holliman et al. | 382/100 |
| 2003/0200554 | A1 * | 10/2003 | Noetsele | 725/142 |
| 2008/0002776 | A1 * | 1/2008 | Borer et al. | 375/240.26 |

FOREIGN PATENT DOCUMENTS

| EP | 1 343 926 A | 4/2003 | |
| EP | 1298926 A1 * | 4/2003 | .............. H04N 7/16 |
| EP | 1 343 323 A | 9/2003 | |

* cited by examiner

*Primary Examiner* — Randy Flynn
(74) *Attorney, Agent, or Firm* — Ryan, Mason & Lewis, LLP (57) ABSTRACT

A television broadcasting system is described in which a transmission unit controls the presentation of items of enhanced content during a running program. The presentation of the items of enhanced content is triggered in response to receipt by the transmission unit of periodic indications embedded in the running program. For each periodic indication, a criterion indicative of the quality of that periodic indication is measured and stored by the transmission unit as quality data. During the running program, if no indication is received by the transmission unit for a predetermined time, the transmission unit accesses the quality data to determine an expected indication quality. If the expected indication quality is above a threshold quality level, the triggering of enhanced content is suspended. On the other hand, if the expected indication quality is below the threshold, the presentation of enhanced content continues to be triggered.

30 Claims, 4 Drawing Sheets

Fig. 1

PRIOR ART

Fig. 4

DISPLAY OF ENHANCED CONTENT

FIELD OF THE INVENTION

This invention relates to interactive television systems, and in particular to the display of enhanced content in interactive television systems.

BACKGROUND OF THE INVENTION

Figure 1:
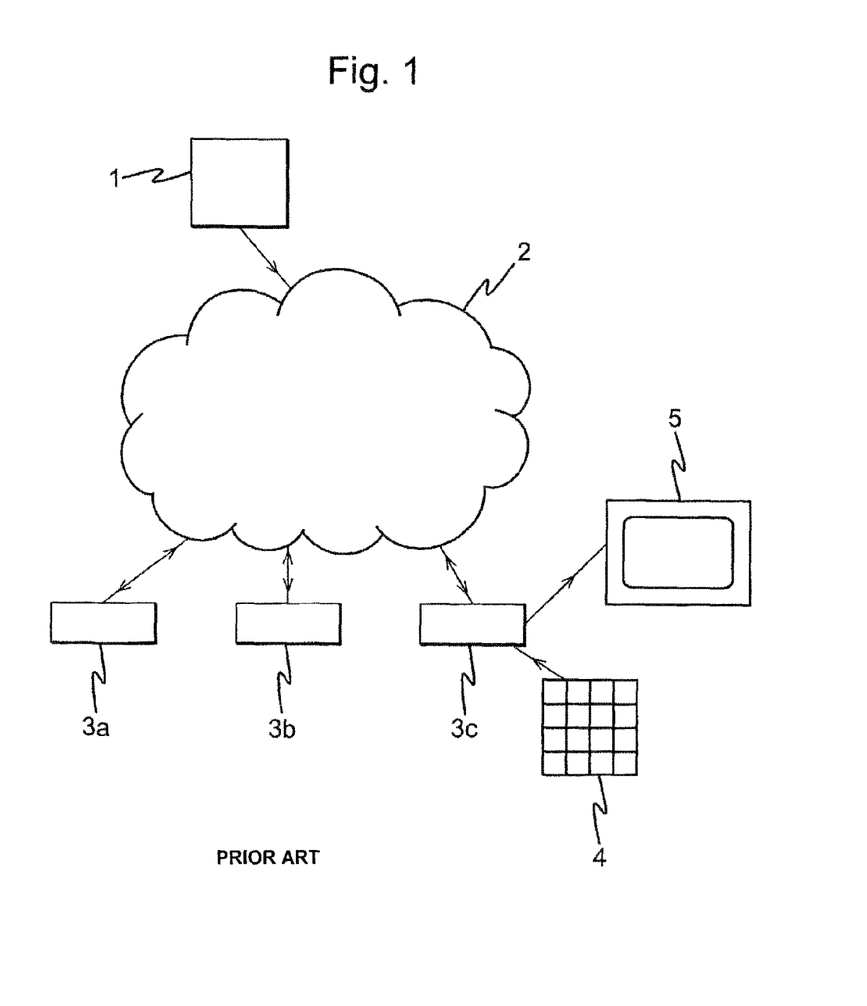
FIG. 1 shows a prior art interactive television system.

A prior art interactive television system is shown generally in FIG. 1. The system includes a digital video data provider 1, decoders 3a-c for converting the digital video data to an analogue format, a television 5 at each decoder for displaying the video data, and enhanced content transmitted over a network 2. In current systems, the enhanced content is transmitted to decoders, or set-top boxes (STBs), which then display pages of enhanced content on a television. A user input device 4 is provided at each decoder 3a-c so that a user can adjust settings of the decoder and/or the television 5 and respond to queries or questions in the enhanced content. The user input device 4 could, for example, be a keypad or remote control.

The enhanced content is typically content available to be displayed at the direct or indirect request of a user onto a television screen. The enhanced content is typically in addition to the basic A/V (audio/visual) data of a television program or movie. It may consist of information, such as news, television schedules, or weather reports, or may invite a response from a user.

Enhanced content may be transmitted over a network independently of A/V data, or alternatively may be embedded in the A/V data.

The term "interactive television" suggests that a viewer can provide input to the system, for example to respond to queries within the enhanced content or to control the video stream that he receives. An example of a user input/response is an answer to a question posed in the enhanced content (or interactive content). If the video content being displayed on a television is, for example, a quiz show, it may be desirable to provide interactive content consisting of quiz questions corresponding to those being asked in the quiz show.

Figure 2:
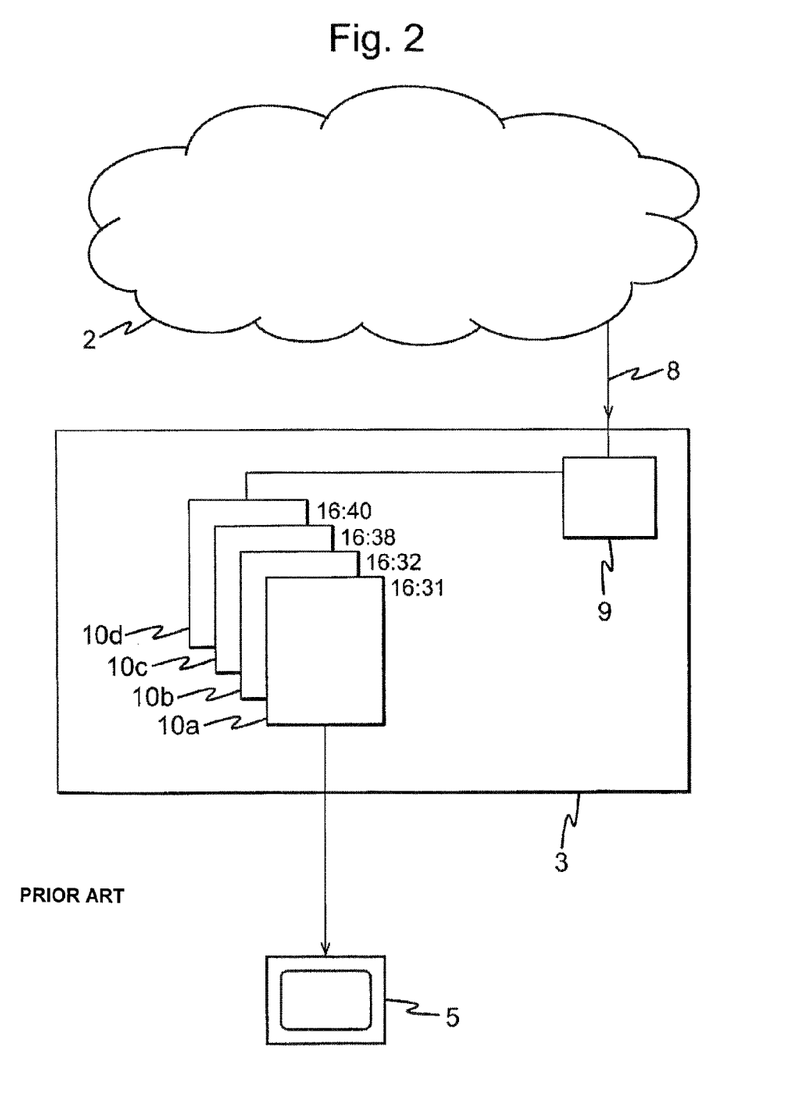
FIG. 2 shows in more detail the decoding arrangement of a prior art interactive television system.

FIG. 2 shows in more detail the decoding arrangement of a prior art interactive television system. A network 2 provides decoder 3 with a stream of enhanced content 8, together with an indication of the required flow of that content. The flow will normally be indicated by reference to a video stream that that enhanced content accompanies. The enhanced content 8 is inputted to a formatting unit 9 for formatting its input signal into a series of pages 10a-d of enhanced content for display on television 5.

Each page 10a-d could have associated with it a time at which it is to be displayed on the television. In this implementation, referring to the example shown in FIG. 2, the pages 10a-d are associated with a television program which commences at 16.30. The first page, 10a, is to be displayed at 16.31. The second page, 10b is to be displayed at 16.32, and 10c and 10d are to be displayed at 16.38 and 16.40 respectively.

This arrangement has a number of disadvantages. Firstly, the broadcast schedule must be known by the provider of enhanced content in advance of the transmission of the stream of enhanced content 8. In this way, the time at which each page of enhanced content is to be displayed can be embedded into the stream 8 before transmission. In addition to the enhanced content provider requiring information regarding the start time of each television program for which it is providing enhanced content, it also needs information on the timing of any scheduled intermissions in each program.

Secondly, this arrangement for the display of enhanced content is incapable of making adjustments to accommodate changes to the advertised broadcast schedule. Similarly, the arrangement cannot accommodate unadvertised intermissions in the broadcast. These could occur if the broadcast has to be interrupted for some reason. Also, if the broadcast is to be interrupted by advertisements the position and duration of the advertising breaks must be taken into account when the enhanced content is set up. If the broadcast is to be shown on a number of channels which have different advertising schedules then the enhanced content must be set up for each one. As a result, enhanced content for one program may continue to be displayed after that program has been interrupted.

In order to mitigate these problems it is known to provide a series of indications together with the video content. These allow a component of the broadcasting network to broadcast enhanced content associated with a particular video stream on receipt of indications identifying the video stream.

The indications are preferably sent at regular intervals, and identify a video stream (representing a particular show) and a time position within the show. The network component responsible for broadcasting enhanced content can determine precisely when the enhanced content should be sent, and it can also broadcast trigger signals to individual decoders to which the decoders respond by playing out the enhanced content to a viewer of the show.

However, if a periodic indication related to a video stream is not received at the broadcasting component of the network, the enhanced content and the triggers will not be sent and the enhanced content will therefore not be played out to viewers. While this is desirable when, for example, a TV show has ended or during a scheduled break (such as an advertisement break), in some situations it could be a disadvantage since play-out might also be interrupted at times when this is not desired if an indication is not received at the network component due to low signal strength.

It is desirable that there should be an improved way in which the display of enhanced content is synchronised with a video or other signal to which it is related.

SUMMARY OF THE INVENTION

According to one aspect of the present invention there is provided a method in a television broadcasting system in which a transmission unit controls the presentation of items of enhanced content during a running program and the presentation of the items of enhanced content is triggered in response to receipt by the transmission unit of periodic indications embedded in the running program, the method comprising: measuring, for each periodic indication, a criterion indicative of the quality of that periodic indication; storing the measured criteria as quality data; and, during the running program, if no indication is detected by the transmission unit for a predetermined time, accessing the quality data to determine an expected indication quality, and: if the expected indication quality is above a threshold quality level, suspending the triggering of enhanced content, and if the expected indication quality is below the threshold, triggering the presentation of enhanced content.

According to a second aspect of the present invention there is provided a television broadcasting system comprising a transmission unit for controlling the presentation of items of enhanced content during a running program, wherein the presentation of items of enhanced content is triggered in response to the receipt by the transmission unit of periodic indications embedded in the running program, the transmission unit comprising: a receiving unit for receiving, for each periodic indication, a criterion indicating the quality of that indication; a storage unit for storing the criteria as quality data; and an analyser for determining, during the running program, if the periodic indications are detected by the transmission unit, and if no indication has been detected for a predetermined time, accessing the quality data to determine an expected indication quality, and adapted to: suspend the triggering of enhanced content if the expected indication quality is above a threshold quality level, and trigger the presentation of enhanced content if the expected indication quality is below the threshold.

Preferred aspects of the invention are set out in the dependent claims.

Conveniently the running program is transmitted to the decoders as a stream, and the decoders may cause each part (e.g. frame) of the running program to be displayed immediately it is received. For instance, the running program could be transmitted to the decoders as a video stream on a broadcast video channel.

The present invention will now be described in more detail by way of example with reference to the accompanying drawings in which:

DETAILED DESCRIPTION OF THE INVENTION

Figure 3:
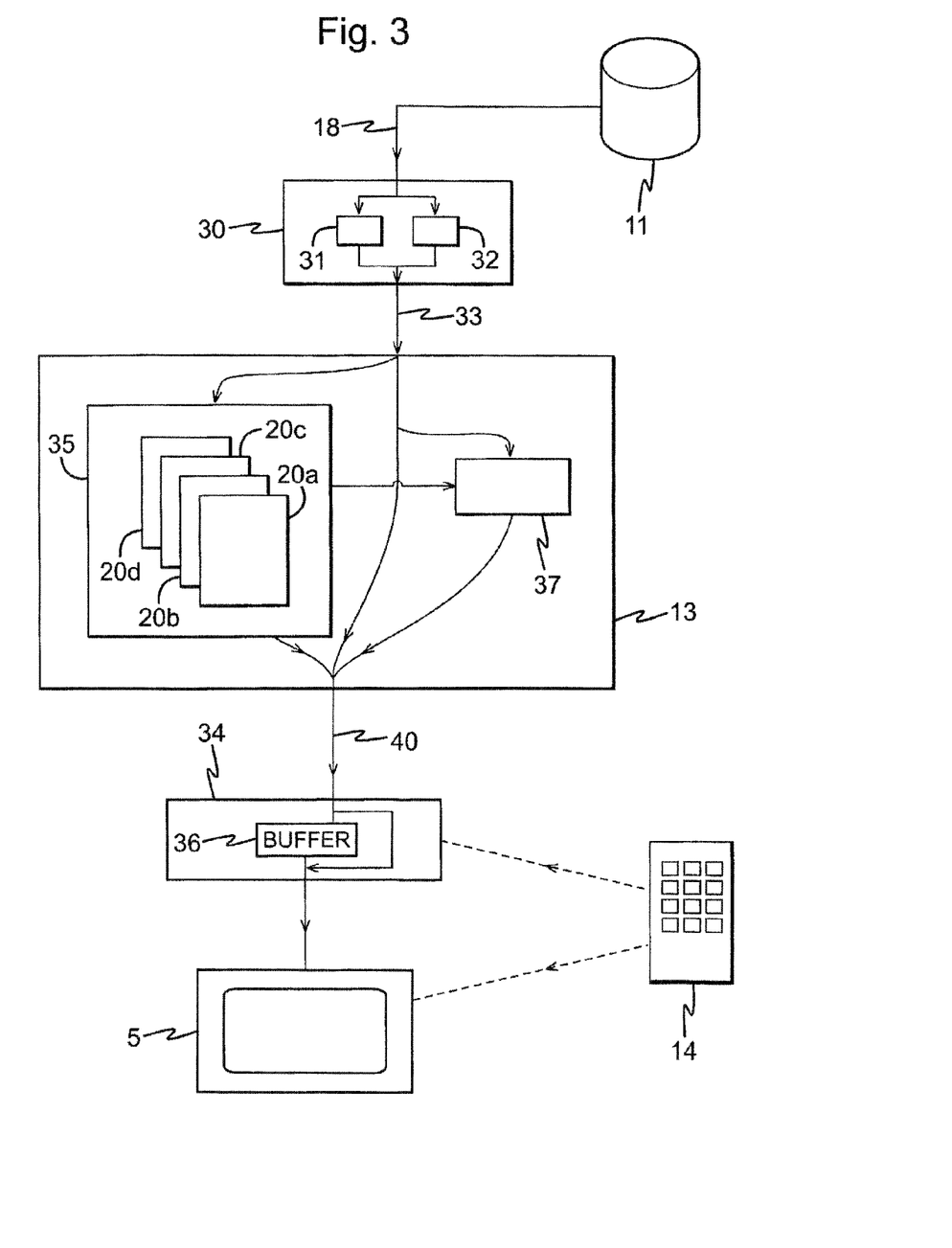
FIG. 3 shows a system for providing and decoding a video stream including enhanced content.

Initially a combined presentation including items of enhanced content and a running program such as a video stream is prepared by a content provider. The content provider also defines a synchronisation schedule which indicates the points relative to the running of the video stream at which each of the items of enhanced content is to be presented (played out) to a user. In the system of FIG. 3 the content provider is indicated at 11.

The synchronisation schedule suitably relates the presentation of some or all of the items of enhanced content to a corresponding time relative to the video stream.

For example, in the case of an MPEG video stream this could be a point as determined from the start of the video stream with reference to the 27 MHz MPEG clock stream.

Some of the items of enhanced content could be accessed on demand by a user (for instance by means of hyperlinks from another item of enhanced content) or when a trigger is sent in real time from a producer of the program. These items would not need to have times stored for them.

In an embodiment of the invention, the content provider 11 transmits the enhanced content, the video stream and the synchronisation schedule over link 18 to a playout management centre (PMC) 30. At the playout management centre certain changes may be made to the video data or the enhanced content to adapt them for successfully being played out over the distribution system of which the playout management centre is a part. In an enhanced content adaptation unit 31 the enhanced content is adapted if necessary so that it can be decoded by the types of decoders (e.g. set-top boxes) that are used in the system.

In the embodiment, a video adaptation unit 32 inserts messages, or indications, at regular intervals in the video stream. Preferably the messages are UCCs (unified content code messages), and are inserted into the video stream at intervals of one second, or more frequently, preferably at regular intervals. UCCs and other regularly inserted messages are referred to generally herein as periodic indications.

Optionally, the periodic indication can be a UCC message, and the UCC message suitably consists of a 15-digit code according to the following layout:

| | | | | | | | Pos: | | | | | | | |
|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 |
| Name: R | R | R | C | C | C | C | P | P | P | P | P | P | P | CS |

R: a 3-digit region number conforming to ISO 3166-1
C: a 4-digit company number
P: a 7-digit product number
CS: a 1-digit checksum number conforming to ISO/IEC 15420 Annex A The UCC codes indicate the identity of a program by means of the R, C and P numbers.

Each UCC also includes a timestamp that indicates the timing of that UCC relative to the start of the video stream.

One way of embedding such data in a video stream involves treating each frame of the video stream separately. In some or all of the frames, the luminance data for pixels is modified according to the data to be embedded. In an exemplary system, UCC data is embedded in every frame, and certain pixels of each frame are modified. The following table shows the modification made to the luminance values of nine pixels (which may be consecutive but are preferably spatially distributed within a frame so that the resulting picture is not perceivably altered) in an original frame of video:

| Luminance of original pixel | Luminance of modified pixel |
|---|---|
| 115 | 114 |
| 154 | 150 |
| 180 | 180 |
| 158 | 156 |
| 183 | 186 |
| 174 | 172 |
| 177 | 177 |
| 168 | 170 |
| 144 | 144 |

Preferably, the overall modification of each frame is imperceptible to the human eye. In the exemplary system the pixels are modified using pseudo-random noise sequences with translational symmetry. A sequence is repeated (tiled) throughout a frame, and the relative position of the noise sequences (tiles) conveys the embedded information. This system renders the embedded information invariant to shift and cropping.

The embedding energy of each UCC could be measured at the video adaptation unit 32. The embedding energy is the amount of energy used to embed the UCC in the video signal at the video adaptation unit 32 and could be taken to represent the quality of the UCC. The term "quality" is used herein in the context of periodic indications to refer to the robustness of the indications embedded in a signal to degradation during transmission. The quality therefore indicates the likelihood that the indications will be detectable in a video stream and will accurately represent the embedded data after transmission of the video stream from one point to another. A higher value of embedding energy indicates that a UCC was more difficult to embed (for example because the video signal to which it was added was of higher amplitude or because the video signal was particularly visually complex) and that it is likely to be of a relatively low quality. Likewise, a lower value of embedding energy indicates that the UCC was easily embedded and that it is likely to be of relatively high quality. The embedding energy values are then converted into "quality" values which directly, rather than inversely, represent the likely quality of the UCCs. The quality data is then stored at the video adaptation unit for subsequent transmission.

Alternatively, instead of measuring the embedding energy other factors could be measured. For example, the criterion could be a factor indicative of the complexity of embedding data in the running program, or it could be a factor indicative of the image quality for a frame, or a series of frames, having embedded periodic indications compared with the same frame or frames with no embedded indications.

In a preferred embodiment the quality data is transmitted with the enhanced content, the video stream and the synchronisation schedule to a playout management centre. The quality data is preferably transmitted separately from the video stream, for example as a data file representing the qualities of all UCCs embedded in a video stream for a particular TV show. This is desirable for a number of reasons. Firstly, as the quality data is obtained only after the UCCs have been embedded in the video stream, for the quality data to be transmitted in the same signal following the quality measurements the quality data would have to be sent later than the video and corresponding UCC data. For example, the quality of UCC x could be embedded together with UCC (x+1). Alternatively, the quality data could be embedded such that it is synchronised with the video and corresponding UCCs but this approach has three main disadvantages. Firstly, it would require an additional embedding process and thus additional overhead. Secondly, data embedded within the video signal is not very easily detectable (which is the reason that it is desirable to use the quality measurement system in the first place). The quality data can more reliably be sent as a separate signal. Thirdly, the video quality would be degraded if additional data were embedded in the video signal as there would be less bandwidth available for transmission of the video data itself.

Preferably, the transmitted quality data includes for each quality measurement an indication of the UCC to which it relates. The quality data can then be associated with the UCCs on receipt at the traffic analyser.

Conveniently, the UCC data could be embedded in the noise of the video signal, for example by modulating the UCC data on the video luminance signal outside the video signal frequency band. In this embodiment the measured quality could be a representation of the average square change in luminance of each pixel due to the imposition of the UCC data. The strength can suitably be measured for every UCC that is embedded into video data. UCCs may suitably be embedded every 0.5 seconds, such that 7200 UCC quality values may be generated per hour of video stream data. Alternatively, UCCs may be embedded every 1 second, or less often, or they may be embedded more frequently. It will be understood that it may not be necessary to measure the quality of every UCC that is embedded. It may be adequate to measure the strength of, say, every second or every fourth UCC and to treat this as being representative of the current UCC signal strength.

Following quality measurement, each UCC may be assigned a quality value representing the quality of the UCC on a pre-determined scale. For example, values of 0 to 100 may be used, with 0 representing the lowest possible quality and 100 representing the maximum possible quality.

The transformed enhanced content, video stream, synchronisation schedule and quality data are transmitted over a link 33 to a media control manager (MCM) 13. The overall distribution system may comprise two or more MCMs, each serving different geographical areas and/or types of decoder.

A number of decoders such as set-top box 34 or digital televisions are connected to the Media Control Manager 13. Each decoder is capable of decoding received items of enhanced content and video stream and causing them to be presented to a user via presentation means such as television 5. A controller 14 is also available to a user, whereby the user can indicate to the decoder which channel he wishes to receive.

Prior to the time when a presentation is to be played out to users the enhanced content for the presentation, the corresponding quality data, and preferably also the synchronisation schedule for the presentation, are transmitted by the playout management centre (PMC) 30 to the Media Control Manager (MCM) 13. At the MCM the synchronisation schedule is stored and the enhanced content can be buffered, if necessary, in buffer 35. Subsequently, the enhanced content is transmitted by the MCM to the decoders that it serves, for instance set-top box (STB) 34, and buffered there, e.g. in buffer 36. Preferably all the enhanced content for the presentation is transmitted to the decoders before the presentation begins, but the enhanced content could be transmitted to the decoders in stages. The decoders can store the enhanced content, but are arranged not to present it until triggered to do so by a trigger signal from the MCM.

When the time comes for the presentation to be played out the video stream is transmitted to the MCM 13 and distributed from there to the decoders. As the video stream is transferred through the MCM a traffic analyser (conveniently located within the MCM) analyses the UCC codes in the video stream and the timing stream of the video stream. The traffic analyser signals the trigger generator to create and broadcast the triggers. The traffic analyser also synchronises the clock used by the trigger generator for the timed trigger broadcasting.

The traffic analyser monitors the UCC codes as they are received. Whilst UCC codes indicating the identity of the presentation are being received in the video stream the trigger generator is enabled to generate trigger signals for sending to the decoders in respect of the enhanced content of that presentation. If the traffic analyser determines that such UCC codes are no longer being received, for example because no such UCC code has been detected for a predetermined period, then it may be disabled for generating trigger signals for sending to the decoders in respect of the enhanced content of that presentation. Since the decoders can be arranged to present enhanced content to viewers only on receipt of trigger signals, the play-out of that enhanced content would then be halted. Optionally, the MCM can additionally halt the broadcast of that enhanced content to the decoders. If UCCs are not detected, this may be because the expected UCCs have low signal strength, and thus a lower chance of being detected and correctly decoded, or it may be because UCCs are no longer being transmitted, for example because a running program is interrupted by a scheduled advertisement break. When the traffic analyser determines that UCC codes are no longer being received, the trigger generator may also transmit a signal to the decoders to cause them to disable the play-out of the enhanced content of that presentation.

When the traffic analyser determines that UCC codes are not being received, the traffic analyser estimates from the quality data the quality of the UCC that has not been detected, in other words the expected quality of the UCC indication following the last received UCC indication. If the quality data for that UCC indicates a high quality then this suggests that the missing UCC should have been detected correctly if transmitted. In that case, the enhanced content should therefore be stopped at the decoding units. This may occur, for example, during an advertisement break, or during an unprogrammed interruption to the planned schedule. In this case, trigger signals will no longer be sent from the traffic analyser to the decoding units, and a disable signal may be sent to terminate play-out. On receipt at the traffic analyser of the next UCC, for example at the end of an advert break, triggers will be re-started so that play-out of the enhanced content will be resumed.

If, on the other hand, the missing UCC is expected from the quality data to have had a low quality, then the traffic analyser will decide that enhanced content should still be played out. In this case it is assumed that the reason that no UCC is detected is that the UCC signal is too weak. It does not indicate that play-out of enhanced content should be terminated, and so trigger signals will still be sent from the traffic analyser to the decoding units to continue play-out.

It is possible that an intended triggering of playout could be missed, for example in the case where an advert break finishes, or a new programme begins, and the UCC quality is sufficiently low that it is not detected by the traffic analyser. In these exemplary cases, the enhanced content would not be triggered because the traffic analyser would determine that the UCCs were not in fact present and that playout was not desirable because of the advert break or the termination of a previous programme. Playout would then only be triggered when a UCC is detected at the traffic analyser, or when a UCC is not detected but the quality data indicates that a UCC having above-threshold quality has been transmitted.

A threshold Q of UCC quality may be defined, so that if the quality is determined to be below the threshold, enhanced content playout will be continued, and if it is above the threshold trigger signals will be suspended and playout of enhanced content will end. The threshold may suitably be a value of 10 on a quality scale varying from 0 to 100. The threshold is preferably fixed but network dependent.

Embodiments of this invention thus ensure that enhanced content playout is not erroneously terminated when weak UCC codes cannot be detected by the traffic analyser. Instead, playout is terminated only when it has been determined that no UCC is present in a particular video stream, for example at the end of a program or during an advertisement break.

Whilst the trigger generator is enabled for sending trigger signals in respect of the enhanced content of the presentation the traffic analyser monitors the timing stream of the video stream of the presentation and compares the current value of the timing stream with the timings indicated in the synchronisation schedule. The MCM maintains a clock that is synchronised to the timestamps contained in the UCCs. When the current value of the clock matches a timing indicated in the synchronisation schedule for an item of enhanced data, and the trigger generator is enabled for generating trigger signals, the trigger generator sends a trigger signal to the decoders to trigger them play out that item of enhanced content.

When the video stream is resumed after a break, the trigger generator determines from the synchronisation schedule whether an item of enhanced content should be being presented at the point at which the video stream has resumed. If so, it triggers the decoders to present that item.

The decoders are arranged to be responsive to the trigger and halt signals, to cause enhanced content to be presented, or to halt presentation of enhanced content respectively.

It is preferred that video stream, enhanced content and the trigger signals are sent to each decoder only in accordance with the channel selection of the decoder's user. Also, a user may select not to have enhanced content presented to him from time to time, for example by configuring his set-top box accordingly.

The presentation of items of enhanced content may also be triggered by their being called by a user using a hyperlink from another item of enhanced content, or by the transmission to the decoders, via the MCM, of an ad hoc trigger signal from a controller at the PMC.

The enhanced content could include video and/or audio data or (if used with a suitable unit for presenting the data to a user) other forms of data. The enhanced content could be defined as pages or clips of information, or in other ways.

Figure 4:
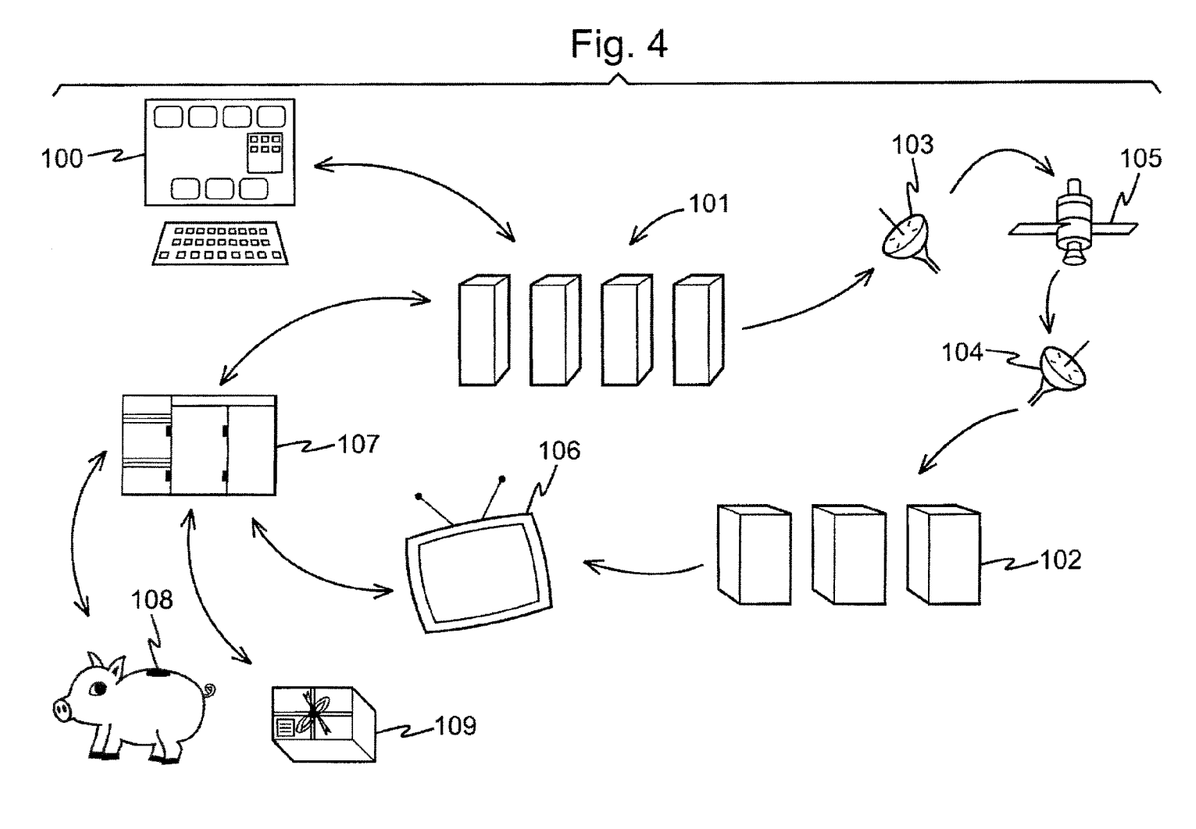
FIG. 4 shows an interactive television network.

FIG. 4 shows an example of a broadcast network in which the present system may be employed.

The network shown in FIG. 4 comprises an Edit Suite 100, a Playout Management Centre 101, a Media Control Manager 102, uplink and downlink stations 103 and 104, a satellite 105, a decoder 106, and a Transaction Management System 107. The decoder 106 may, for example, be a set-top box or a digital television. Each of the components of the system will be described in turn. The components can communicate with each other as indicated by the arrows in FIG. 4.

Interactive content is produced at the Edit Suite 100 (specifically, in a Content Production Manager (CPM)) on generic re-usable templates. The general templates can be manipulated by designers to produce a template with the desired format for a particular application. This specific template can then be saved to the memory of the CPM. Subsequent data can be added easily and quickly to the application-specific template, for example, daily news, weather or TV guides.

Once data has been added to a template at a CPM, the populated template is inputted to an Event Broker Console (EBC), the second stage of an Edit Suite, where it has a stream script added to it.

Meta-data (the UCCs and timestamps described above) is then added to the main broadcast stream (i.e. the video stream) that is associated with the content of the template. The meta-data allows the stream script to be triggered in real-time to synchronise the content with the main broadcast stream. For live television events, the EBC can be used to manage the broadcast of interactive pages, as will be described later. UCC quality is measured at the Edit Suite, and quality data is compiled for transmission with the broadcast stream.

Following production at the Edit Suite, the template data is passed to a Playout Management Centre (PMC) 101, which converts the data to a signal (representing pages of interactive content) in the relevant format for any platform on which it is to be received and displayed. The PMC can store the interactive content until it is needed. Once the interactive content is required, it is transmitted to a Media Control Manager (MCM) 102. To reach the MCM the interactive content could be sent to an uplink station 103 and transmitted via a satellite 105 to a downlink station 104 or could be sent in another way, for instance by cable.

The MCM 102 is located in a cable TV digital head end. The MCM receives interactive data from a PMC 101, stores it until it is to be played out, and, in response to receiving a trigger, broadcasts it to decoders 106. The decoders could be set-top boxes connected to televisions, or they could be digital televisions.

The MCM can be informed in a number of ways of when to cause a page of interactive content to be played out, by being transmitted from the MCM to the decoder 106, and subsequently displayed. For example, if the television event to which the interactive content is related is being broadcast live, then an editor at an Edit Suite 100 can manually trigger the play-out of the content from the MCMs 102 to ensure that the content is synchronised with an appropriate part of the television event. A trigger would be sent from the Edit Suite 100 to the PMC 101; the PMC would transcode the trigger and forward it to the MCM 102, and then the MCM would broadcast the trigger towards decoders 106. In the case of a live event, meta-data is not added to the content, but instead an engineer directly controls the sending of the (de)activation signal and the triggers according to the images from the main broadcast stream, the activation and deactivation signal respectively initiate and terminate the broadcasting of the enhancements, the triggers are used to trigger the decoder to display the required page.

Alternatively, triggers can be arranged to be sent automatically at pre-determined times during a television event. In this case, the MCM has access to a time schedule and on the basis of this schedule, sends triggers to decoders at the times when it is desired for the interactive content to be played out. For instance, a TV program might start at 7.30 pm, and triggers could then be sent automatically from the MCM 102 at 7.31 pm, 7.35 pm, 7.42 pm and so on, depending on the parts of the programme with which each page of interactive content is related. As another alternative, markers could be embedded in the video signal associated with a particular set of interactive pages, and triggers could be generated in dependence on the association between the markers and the pages. These markers would be the meta-data referred to above which is added to the video stream.

The MCM 102 can also manage the bandwidth allocated to video signals and interactive content signals according to television events taking place. Content can also be stored/buffered at the MCM.

A Transaction Management System (TMS) 107 is employed to deal with responses of subscribers to the interactive content broadcast. The TMS is capable of handling large numbers of concurrent responses, and can produce, for example, lists of winners of a competition following the subscriber responses. The TMS is linked to the PMC so that information related to subscriber responses can be fed back and inserted into broadcasts from the MCM 102. In addition, the PMC can communicate with the TMS.

For handling payments to action user responses the TMS is linked to a banking system 108. The TMS may send signals to other functions such as a third party fulfilment centre 109 so as to action user responses, for example to fulfil purchases or issue prizes.

Editors at the Edit Suites 100 can communicate with the TMS 107 via PMC 101 in order to determine how the TMS should react to responses sent from subscribers.

In a system as described above with reference to FIG. 4, there would typically be multiple Edit Suites 100, one PMC 101, multiple MCMs 102 distributed geographically across an area served by the network, and one TMS 107, although in future it may be desirable in terms of efficiency to provide multiple PMCs and/or TMSs. Decoders 106 would be positioned locally to individual viewers, for example in their homes or in public buildings.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method in a television broadcasting system in which a transmission unit controls a presentation of items of enhanced content during a running program and the presentation of the items of enhanced content is triggered in response to receipt by the transmission unit of periodic indications embedded in the running program, the method comprising:
    measuring, for each periodic indication, a criterion indicative of the quality of that periodic indication;
    storing the measured criteria as quality data; and, during the running program, if no periodic indication is detected by the transmission unit for a predetermined time, accessing the quality data to determine an expected indication quality, and:
    if the expected indication quality is above a threshold quality level, suspending the triggering of items of enhanced content whilst the running program remains running, and
    if the expected indication quality is below the threshold, triggering the presentation of items of enhanced content, wherein the items of enhanced content are additional content capable of being displayed at the direct or indirect request of a user; and wherein the items of enhanced content are capable of being presented in addition to a basic content of the running program.

2. A method according to claim 1 wherein the measured criteria indicate an energy used to embed the periodic indications.

3. A method according to claim 1 wherein the measured criteria indicate a complexity of the running program in which the periodic indications are embedded.

4. A method according to claim 1 wherein the measured criteria indicate a degree of change to images represented by the running program as a result of the embedding of the periodic indications in the running program.

5. A method according to claim 1 wherein the measured criteria indicate a robustness of the periodic indications.

6. A method according to claim 1 wherein each periodic indication is carried over a luminance channel of video data of the running program.

7. A method according to claim 1 wherein each criterion represents, for a plurality of pixels in a frame of the running program, a magnitude of a difference between luminance data for a pixel before a periodic indication has been embedded and luminance data for that pixel after a periodic indication has been embedded.

8. A method according to claim 1 wherein the predetermined time is a period between consecutive periodic indications.

9. A method according to claim 1 wherein the predetermined time is twice a period between consecutive periodic indications.

10. A method according to claim 1 wherein the presentation of items of enhanced content occurs at a plurality of decoders in the system, and triggers from the transmission unit are sent to the decoders.

11. A method according to claim 1 wherein each indication includes an indication of an identity of the running program.

12. A method according to claim 11 wherein each indication further includes an indication of a position within the running program at which an item of enhanced content, with which the indication is associated, is to be presented.

13. A method as claimed in claim 1, wherein the running program comprises a video stream.

14. A method as claimed in claim 1, wherein the running program comprises an audio stream.

15. A method as claimed in claim 1, wherein the quality data are transmitted to the transmission unit in a signal separate from that carrying the running program.

16. A television broadcasting system comprising a transmission unit for controlling a presentation of items of enhanced content during a running program, wherein the presentation of items of enhanced content is triggered in response to the receipt by the transmission unit of periodic indications embedded in the running program, the transmission unit comprising:
- a receiving unit for receiving, for each periodic indication, a criterion indicating the quality of that periodic indication;
- a storage unit for storing the criteria as quality data; and
- a traffic analyser unit that determines, during the running program, if the periodic indications are detected by the transmission unit, and if no periodic indication has been detected for a predetermined time, accesses the quality data to determine an expected indication quality, and is adapted to:
  - suspend the triggering of items of enhanced content if the expected indication quality is above a threshold quality level whilst the running program remains running; and
  - trigger the presentation of items of enhanced content if the expected indication quality is below the threshold, wherein the items of enhanced content are additional content capable of being displayed at the direct or indirect request of the user; and wherein the items of enhanced content are capable of being presented in addition to a basic content of the running program.

17. A television broadcasting system as claimed in claim 16 wherein the criteria indicate an energy used to embed the periodic indications.

18. A television broadcasting system as claimed in claim 16 wherein the criteria indicate a complexity of the running program in which the periodic indications are embedded.

19. A television broadcasting system as claimed in claim 16 wherein the criteria indicate a degree of change to images represented by the running program as a result of the embedding of the periodic indications in the running program.

20. A television broadcasting system as claimed in claim 16 wherein the criteria indicate a robustness of the periodic indications.

21. A television broadcasting system as claimed in claim 16 wherein each periodic indication is carried over a luminance channel of video data of the running program.

22. A television broadcasting system as claimed in claim 16 wherein each criterion represents, for a plurality of pixels in a frame of the running program, a magnitude of a difference between luminance data for a pixel before a periodic indication has been embedded and luminance data for that pixel after a periodic indication has been embedded.

23. A television broadcast system as claimed in claim 16 wherein the predetermined time is a period between consecutive periodic indications.

24. A television broadcasting system as claimed in claim 16 wherein the predetermined time is twice a period between consecutive periodic indications.

25. A television broadcasting system as claimed in claim 16 further comprising a plurality of decoders, and wherein the presentation of items of enhanced content occurs at at least some of the plurality of decoders, and triggers from the transmission unit are sent to the decoders.

26. A television broadcasting system as claimed in claim 16 wherein each indication includes an indication of an identity of the running program.

27. A television broadcasting system as claimed in claim 16 wherein each indication further includes an indication of the position within the running program at which presentation of an item of enhanced content, with which the indication is associated, is to be triggered.

28. A television broadcasting system as claimed in claim 16 wherein the running program comprises a video stream.

29. A television broadcasting system as claimed in claim 16 wherein the running program comprises an audio stream.

30. A television broadcasting system as claimed in claim 16 wherein the quality data are transmitted to the transmission unit in a signal separate from that carrying the running program.

* * * * *